(12) United States Patent
Haechten et al.

(10) Patent No.: US 7,899,945 B2
(45) Date of Patent: *Mar. 1, 2011

(54) INTERFACE DEVICE AND METHOD FOR COMMAND PROCESSING

(75) Inventors: John B. Haechten, Buda, TX (US); John F. Tyndall, Austin, TX (US)

(73) Assignee: Crossroads Systems, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/771,403

(22) Filed: Apr. 30, 2010

(65) Prior Publication Data

US 2010/0241769 A1 Sep. 23, 2010

Related U.S. Application Data

(63) Continuation of application No. 10/929,220, filed on Aug. 30, 2004, now Pat. No. 7,711,871.

(51) Int. Cl.
*G06F 3/00* (2006.01)
*H04L 12/28* (2006.01)
*H04L 12/56* (2006.01)

(52) U.S. Cl. .................. 710/5; 710/20; 710/29; 370/394

(58) Field of Classification Search .................. 710/5, 710/20, 29; 370/394
See application file for complete search history.

(56) References Cited

U.S. PATENT DOCUMENTS

| 6,041,381 | A | * | 3/2000 | Hoese | 710/315 |
| 6,163,540 | A | * | 12/2000 | Cheung et al. | 370/394 |
| 6,185,631 | B1 | * | 2/2001 | Casper et al. | 710/20 |

* cited by examiner

*Primary Examiner*—Alford W Kindred
*Assistant Examiner*—Farley J Abad
(74) *Attorney, Agent, or Firm*—Sprinkle IP Law Group

(57) ABSTRACT

Embodiments of the present invention provide an interface device and method for command processing for commands requiring data flow in both directions on a Fiber Channel or other data transport protocol exchange. The commands can include proprietary commands, SCSI linked commands or other commands known in the art. According to one embodiment, and interface device can assign a command a data flow direction indicator. When a reply to the command is received, the interface device can determine if the reply is expected or unexpected based on the data flow direction specified by the data flow direction indicator. If the reply is unexpected, the interface device can determine whether to process the reply. According to one embodiment, the data flow direction indicator can be the exchange identification.

20 Claims, 5 Drawing Sheets

US 7,899,945 B2

INTERFACE DEVICE AND METHOD FOR COMMAND PROCESSING

RELATED APPLICATIONS

This application is a continuation of, and claims a benefit of priority under 35 U.S.C. 120 of the filing date of U.S. patent application Ser. No. 10/929,220 by inventors John B, Haechten and John F. Tyndall, entitled "Interface Device and Method for Command Processing" filed on Aug. 30, 2004, now U.S. Pat. No. 7,711,871, the entire contents of which are hereby expressly incorporated by reference for all purposes.

TECHNICAL FIELD OF THE INVENTION

The present invention relates to data communication systems. More particularly, the present invention relates to processing commands in data communications systems. Even more particularly, embodiments of the present invention relate to processing bi-directional commands on an exchange in a fiber channel data communications system.

BACKGROUND

The small computer system interface ("SCSI") protocol has become a ubiquitous protocol for formatting commands. Versions of the SCSI standard (e.g., SCSI-1, SCSI-2, SCSI-3) define both a set of commands ("SCSI commands") a data transport protocol for sending the commands and a SCSI physical interface. SCSI commands can be encapsulated according to a variety of data transport protocols without using the SCSI data transport protocol or SCSI physical interface. Example protocols include fiber channel, serial storage architecture, serial bus protocol, iSCSI, advanced technology attachment ("ATA"), serial ATA ("SATA"), serial attached SCSI ("SAS") and others. Thus, the SCSI standard separates the SCSI physical interface, SCSI command sets and the SCSI data transport protocol.

SCSI commands are used in a variety of data communications systems that utilize one or more data transport protocols. For example, SCSI commands are commonly used in fiber channel storage area networks (SAN) for commanding tape, disk and other storage devices to perform various operations. Because utilization of SCSI commands does not require utilization of the SCSI data transport protocol or interface, hosts operating according to the fiber channel data transport protocol can send commands understandable to devices operating according to the SCSI data transport protocol. However, while the SCSI commands can be sent using a variety of data transport protocols, the separation of SCSI commands from the SCSI data transport protocol can lead to operability issues when SCSI commands are sent using other data transport protocols. One example of this is found in the difficulty encountered when sending linked SCSI commands using the fiber channel data transport protocol.

The SCSI standard allows SCSI commands to be linked together. A bit in the command descriptor block ("CDB") of a SCSI command can be set to specify whether or not the command is linked. A set of linked commands can specify data flow both to and from a target. Fiber channel devices, however, typically only allow data to be transported in one direction over an exchange. To send a command requiring data flow in the opposite direction of a previous command, the fiber channel device must typically open a new exchange, causing the link between the commands to be broken. Therefore, typical prior art fiber channel devices do not support linked commands requiring data flow in both directions. Additionally, prior art fiber channel devices do not typically support proprietary commands that require data flow in both directions.

SUMMARY OF THE INVENTION

Embodiments of the present invention provide an interface device and method for command processing that eliminate or at least substantially reduce the shortcomings of prior art command processing systems and methods. One embodiment of the present invention can include receiving a command, wherein at least a portion of the command specifies data flow in a first direction, and assigning the command an indicator of data flow direction indicating data flow in a second direction. The first direction and second direction are different directions. By assigning the command an indicator of data flow direction in a different direction (the second direction) than the direction specified by the command (first direction), the command is essentially masked as command requiring data flow in the first direction.

Another embodiment of the present invention can include receiving a command that specifies a first data flow direction according to a first data transport protocol, assigning the command an exchange identification that indicates a second data flow direction, forwarding the command according to a second data transport protocol, and receiving a reply to the command. If the reply to the command is expected based on the second data flow direction, this embodiment can further include processing the command. Or, if the reply is unexpected based on the second data flow direction, this embodiment can include determining if the reply is associated with the command and if the reply is associated with the command, processing the reply.

Yet another embodiment of the present invention can include receiving a command according to a first data transport protocol, with at least a portion of the command specifying a first direction of data flow, assigning the command an exchange identification that indicates a second direction of data flow in the opposite direction as the first direction of data flow, generating a frame corresponding to the command that contains the exchange identification, forwarding the frame according to a fiber channel data transport protocol, receiving an unexpected reply containing the exchange identification, determining that the reply corresponds to the command assigned the exchange identification and processing the reply.

Another embodiment of the present invention can include an interface device having a first controller operable to connect to a first data transport medium operating according to a first data transport protocol, a second controller configured to connect to a second data transport medium operating according to a second data transport protocol and interface logic coupled to the second controller and the first controller. The interface logic can be operable to receive a command from the first controller that specifies a first direction of data flow and assign the command an indicator of data flow direction that indicates a second direction of data flow in a different direction than the first direction of data flow.

Yet another embodiment of the present invention can include a first controller operable to connect to a first data transport medium operating according to a first data transport protocol, a fiber channel controller configured to connect to a second data transport medium operating according to a fiber channel protocol and interface logic coupled to the second controller and the first controller. The interface logic can be operable to receive a command from the first controller that specifies a first direction of data flow, assign the command an exchange identification that indicates a second direction of data flow in the opposite direction as the first direction of data flow and determine if an unexpected reply is associated with the command.

Another embodiment can include placing a fiber channel controller in a read direction hardware assist mode for a write direction hardware assist mode, receiving a command specifying data flow in a write direction, assigning the command an exchange identification that indicates a data flow in the read direction to the fiber channel controller, formatting on or more fiber channel frames corresponding to the command that include the exchange identification, forwarding the one or more fiber channel frames, receiving a transfer ready reply including the exchange identification, generating an interrupt at the fiber channel controller and exiting the write direction hardware assist mode, determining that the transfer ready reply corresponds to the command, instructing the fiber channel controller to respond to the transfer ready reply and reasserting the write direction hardware assist.

Yet another embodiment of the present invention can include a computer program product comprising a set of computer instructions stored on a computer readable medium, wherein the set of computer instructions comprise instructions executable to: receive a command, wherein at least a portion of the command indicates a first data flow direction, assign the command an indicator that indicates a second data flow direction, wherein the second data flow direction is the opposite of the first data flow direction, receive an interrupt indicating that an unexpected result was received, determine if the unexpected reply is in response to the command, and if the unexpected reply is in response to the command, instruct a controller to process the reply.

The present invention provides an advantage over prior art systems and methods by allowing bi-directional linked commands to be processed on the same exchange.

Embodiments of the present invention provide another advantage over prior art systems and methods by allowing processing of vendor specific commands, such as the SKIP READ and SKIP WRITE command over a single exchange.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Embodiments of the present invention provide a system and method of processing commands, including linked bidirectional commands. More particularly, embodiments of the present invention provide a system and method of processing SCSI linked commands over a fiber channel data transport medium. According to one embodiment of the present invention, an interface device, such as a network interface card ("NIC"), host bus adapter ("HBA"), server attached device, storage routing device or other interface device can assign commands specifying data flow in one direction (e.g., the write direction) an indicator indicating that data flow is in another direction (e.g., the read direction). Because, in this example, the command appears to require data flow in the write direction based on the indicator, the command can be sent over the same exchange as commands specifying data flow in the read direction.

It should be noted that a command can specify a data flow to the target (e.g., in the write direction), from the target (e.g., in the read direction) or no data flow. The "direction of data flow" or "data flow direction" refers the direction in which data flows. Although the direction of data flow for a command may be to a target (e.g., in the write direction) or from the target (e.g., in the read direction), commands, status messages and replies may flow in both directions. For example, a device can send a write command to a target, receive a transfer ready indication, send data to the target, receive a transfer ready reply, send additional data to a target and receive a response from the target. In this case, data flow is to the target although frames or other structures corresponding to commands, status messages and responses flow in both directions. Although the command can specify data flow to/from the target, the command can be sent to another device, such as a switch, storage routing device or other device for forwarding to the target. The target can be any device, including a storage device, computer, router or other device, that can receive and respond to commands.

Figure 1:
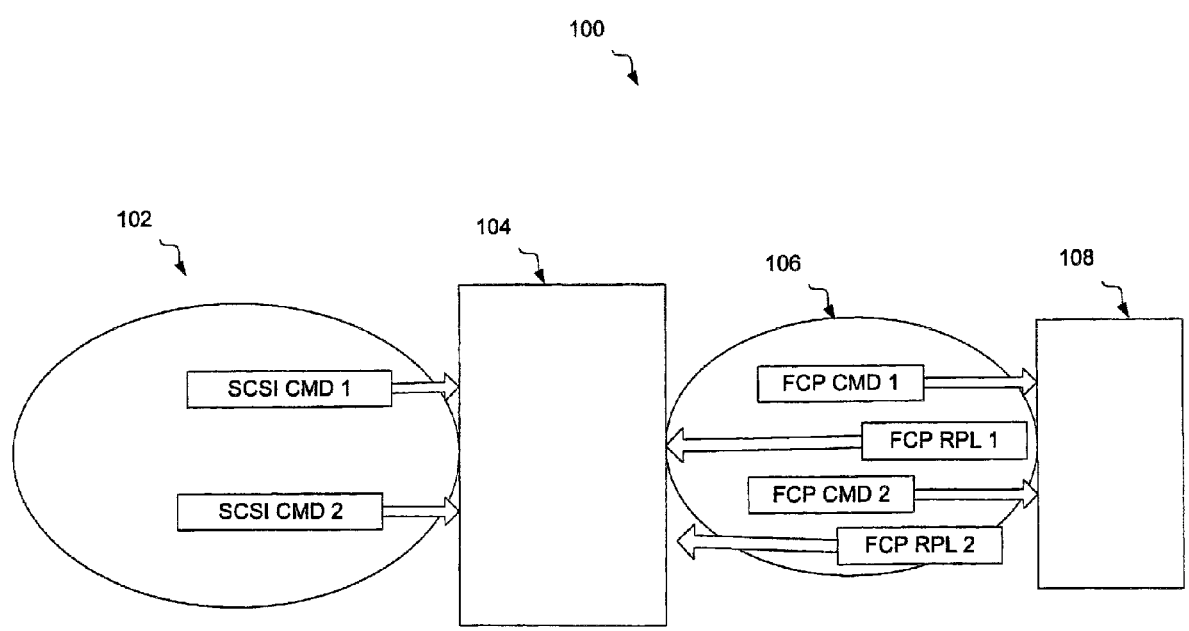
FIG. 1 is a diagrammatic representation of one embodiment of a communication system according to the present invention.

FIG. 1 is a diagrammatic representation of one embodiment of a communication system 100 according to the present invention. Communication system 100 can include a first data transport medium 102, an interface device 104, a second data transport medium 106 and a second interface device 108. First data transport medium 104 and second data transport medium 106 can operate according to any data transport protocol known in the art, including SCSI, Fiber Channel, advanced technology attachment ("ATA"), serial ATA ("SATA"), iSCSI, infiniband, parallel SCSI, serial attached SCSI or other data transport protocol known in the art. By way of example, first data transport medium 102 can be a SCSI bus operating according to a SCSI data transport protocol and second data transport medium 106 can be a fibre channel network operating according a fiber channel protocol.

Upon receipt of a command (e.g., SCSI CMD 1), interface device 104 can map SCSI addresses to a fiber channel addresses according to any address mapping scheme known in the art, including that described in U.S. Pat. No. 6,041,381, entitled "Fiber Channel to SCSI Addressing Method and System," issued Mar. 21, 2000 to Hoese (the "Addressing patent"), which is hereby fully incorporated by reference herein. Based on the fiber channel destination address, interface device 104 can establish a connection between a port on interface device 104 (e.g., N_Port1) and a port at fiber channel interface 108 (e.g., N_Port2). The connection can be direct connection, a switched fabric connection, an arbitrated loop connection or other fiber channel network connection.

Interface device 104 can forward SCSI CMD 1 as a fiber channel command (e.g., "FCP CMD 1") to N_Port2 via fiber channel network 106. FCP CMD 1 can, according to one embodiment of the present invention, include frames that encapsulate SCSI CMD 1. Interface device 104 can assign the frames an exchange identification corresponding to a direction of data transfer (e.g., data transfer to or from the target). As described in conjunction with FIG. 2, the exchange identification may correspond to the same direction of data transfer as specified by the command or the opposite direction.

Interface device 104 can receive a corresponding fiber channel reply ("FCP RPL 1") based on FCP CMD 1. FCP RPL 1 can be any reply to a command known in the art, such as a transfer ready indication, data, an FCP Response or other reply known in the art. FCP RPL 1 will typically include the same exchange identification as the corresponding command (e.g., the same exchange identification as FCP CMD 1). Based on FCP RPL 1, interface device 104 can take additional actions, such as sending data frames if FCP CMD 1 contains a WRITE command, completing processing of the command or other actions as would be understood by those of ordinary skill in the art. Although only one reply is shown, multiple replies can be sent based on a single command.

Interface device 104 can also receive a second SCSI command (e.g., "SCSI CMD 2") linked to a previous command (e.g., SCSI CMD 1) via SCSI bus 102. SCSI CMD 2 can be received directly subsequent to SCSI CMD 1 or can be separated from SCSI CMD 1 by other commands. Interface device 104 can again map the command to N_Port2, or other port, of fiber channel interface 108 and format the command according to the fiber channel transport protocol (e.g., form "FCP CMD 2"). Frames corresponding to FCP CMD 2 can be formatted to include the same exchange identification as used for frames corresponding to FCP CMD 1 as the SCSI commands which they encapsulate are linked. Again, the exchange identification may indicate a data flow direction in the same direction as specified by SCSI CMD 2 or in the opposite direction.

Interface device 104 can receive a reply ("FCP RPL 2") to FCP CMD 2 over fiber channel network 106. Frames associated with FCP RSP 2 can contain the same exchange identification as FCP CMD 2, and hence the same exchange identification as FCP CMD 1. FCP RPL 2 can be any reply to a command such as a transfer ready indication, data, a command complete reply and FCP Response or other reply known in the art. Again, while only one reply is shown, multiple replies may be sent by a target in response to a particular command.

Embodiments of interface device 104 can thus assign the same exchange identification, or other indication of data flow direction, to multiple linked commands regardless of the direction of data flow specified by the command. Interface device 104 can, for example, assign a READ command and a WRITE command the same exchange identification. Because, for some fiber channel controllers, the exchange identification indicates the direction of data flow, assigning the same exchange identification to both READ and WRITE commands masks one command as the other. If the exchange identification assigned to a WRITE command indicates a data flow from the target (i.e., data flow in the READ direction), the fiber channel controller will, essentially, determine that it is sending a READ command and send the command using the same exchange. As will be discussed in conjunction with FIG. 4, using the same exchange identification or other data flow direction indicator for both READ and WRITE commands, or other commands requiring data flow, can lead to unexpected replies on an exchange.

Figure 2:
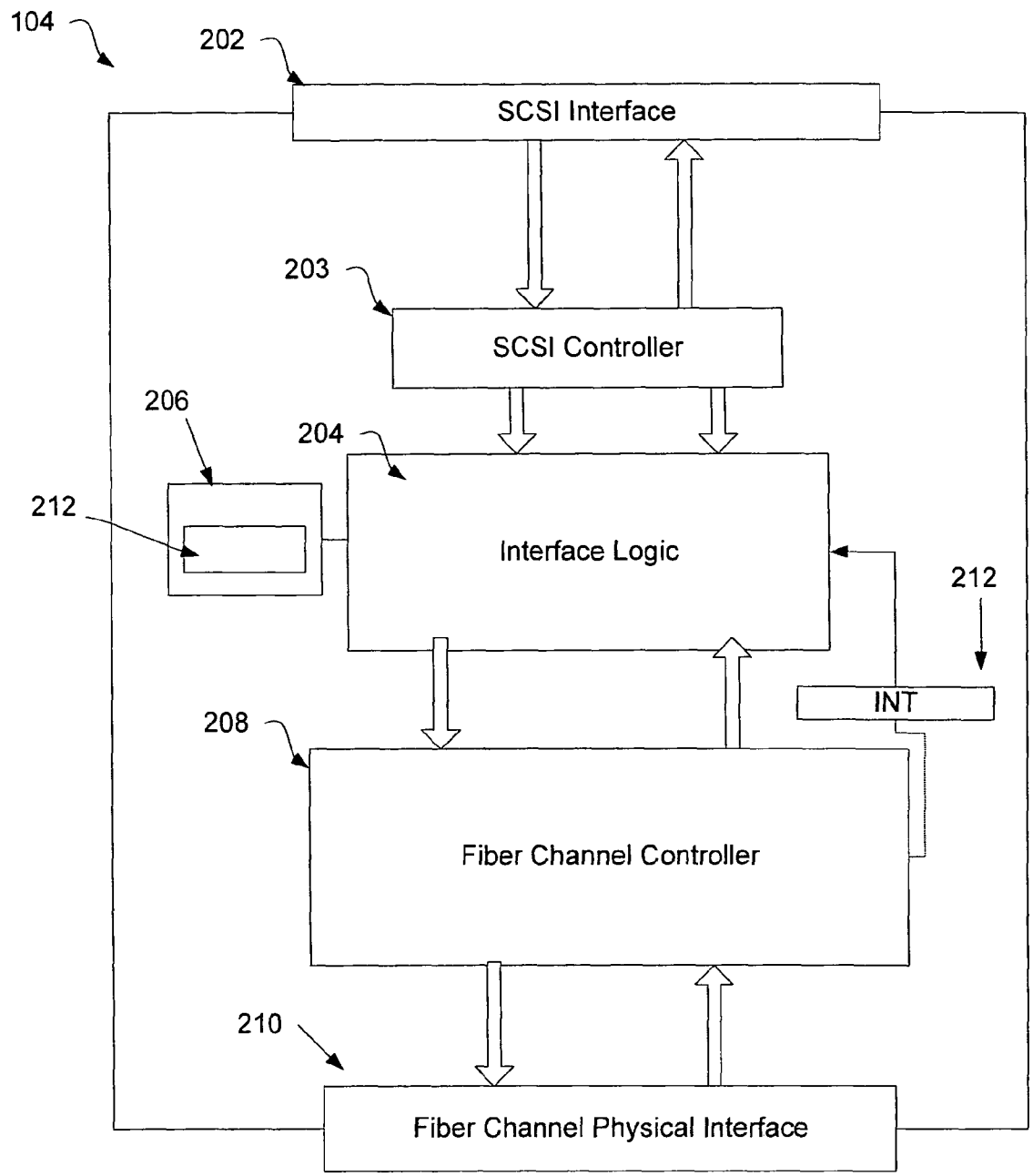
FIG. 2 is a diagrammatic representation of one embodiment of an interface device.

FIG. 2 is a diagrammatic representation of one embodiment of interface device 104 in greater detail. According to the embodiment of FIG. 2, interface device 104 can be server attached device, a host bus adapter ("HBA") or network interface card ("NIC"), a storage routing device or other device capable of processing commands to another device. According to one embodiment of the present invention, interface device 104 can include a SCSI interface 202, a SCSI controller 203, interface logic 204, computer readable medium 206 (e.g., RAM, ROM, Flash Memory, magnetic storage or other computer readable medium known in the art), a fiber channel controller 208, and a fiber channel physical interface 210 having one or more ports. Interface logic 204 can include any processors, buffers and other logic to mapping commands from one data transport medium to another. Computer readable medium 206 can include a set of computer instructions 212 ("program 212") executable by one or more processors of interface logic 204 for mapping SCSI commands to fiber channel commands and handling linked bi-directional SCSI commands. According to one embodiment of the present invention, program 212 can include the fiber channel driver program.

Embodiments of the present invention can be implemented, for example, in the VICKSBURG HBA or SA40 SERVERATTACH, each of which is produced by Crossroads Systems, Inc., of Austin, Tex. Embodiments of the present invention can further be implemented in storage routing devices, storage devices or other devices in the command path. Exemplary storage routing devices are manufactured by Crossroads Systems, Inc, including the Crossroads 6000 and Crossroads 10000. According to one embodiment of the present invention, fiber channel controller 208 can be a Tachyon fiber channel controller (e.g., Tachyon HPFC-5XXX by Agilent Technologies, Inc. of Palo Alto, Calif.). Various forms of the Tachyon fiber channel controller can be used including, but not limited to, the TL or Tachlite (HPFC-5100), the XL2 (HPFC-5200x, where x is the Rev A, B, C, etc.), the DX2 (HPFC-5400x, where x is the Rev A, B, C, etc.), the DX4 (HPFC-5700x, where x is the Rev A, B, C, etc.). Fiber channel controller 208 can also be any commercially available fiber channel controller or proprietary fiber channel controller.

Fiber channel controller 208 can typically be configured to recognize a particular exchange identification or range of exchange identifications as being associated with the transfer of data to a target and to recognize a different exchange identification or range of exchange numbers to frames associated with commands involving the transfer of data in the opposite direction. In other words, frames associated with READ commands are assigned one set of exchange values and frames associated WRITE commands are assigned another set of exchange values. In the case of a TACHYON fiber channel controller, frames associated with READ commands are typically assigned exchange identification with 8xxx identification (e.g., 8000). Frames associated with WRITE commands, on the other hand, are typically assigned an exchange identification with a 0xxx identification (e.g., 0000). To the TACHYON fiber channel controller, the exchange identification indicates the direction of data flow for a command.

A fiber channel controller, such as the TACHYON fiber channel controller, can include hardware assists in the read direction and write direction. Hardware assists allow fiber channel controller 208 to automatically perform various processes associated with a command to offload the processing from interface logic 204. As an example, assume fiber channel controller 208 has a 64 k buffer, hardware assist is enabled in the WRITE direction and fiber channel controller sends a WRITE command to a target to write 96 k of data. In this example, fiber channel controller 208 can buffer a portion of the write data, say 64 k, send the WRITE command to the target and await a transfer ready reply. The transfer ready reply indicates the amount of data the target is ready to receive, for example 32 k. Fiber channel controller 208 can automatically send the 32 k (e.g., in 2K frames) from its buffer, and automatically request an additional 32 k of data from interface logic 204 and await the next transfer ready response. This process can continue until the entire 96 k of data is written to the target. With out hardware assist enabled in the write direction, fiber channel controller 208 can request the data from interface logic 204 in 2 k blocks. Whether or not hardware assists are enabled is a matter of choice for a particular implementation.

In operation, interface logic 204 can receive linked SCSI commands (e.g., SCSI CMD 1 and SCSI CMD 2) via SCSI Interface 202. For the sake of example, SCSI CMD 1 can include a SCSI READ command and SCSI CMD 2 can include a SCSI WRITE command. Interface logic 204 can map the SCSI commands to a particular fiber channel target as, for example, described in the Addressing patent. Interface logic 204 can also assign the linked commands an exchange identification. Linked commands, regardless of the direction of data flow specified in the command, can be assigned the same exchange identification. According to one embodiment of the present invention, each linked command can be assigned an 8xxx identification in the case of a TACHYON fiber channel controller. Frames associated with SCSI CMD 1 and SCSI CMD 2 can, for example, be assigned an exchange identification of 8000.

Interface logic 204 can build data structures corresponding to the command such as outbound descriptor blocks ("ODB"), extended descriptor blocks ("EDB"), header structures and other structures used by fiber channel controller 208. The ODB points to the EDB which points to data buffers containing any data for a particular sequence of frames. The ODB can also point to the header structure which contains information such as reserve bits, source address, destination address, frame type, sequence count, sequence identification and the exchange identification. Based on the ODB, EDB and header structure, fiber channel controller 208 can format one or more frames for a fiber channel command (e.g., FCP CMD 1) corresponding to SCSI CMD 1 and one or more frames for a fiber channel command (e.g., FCP CMD 2) corresponding to SCSI CMD 2.

Fiber channel controller 208 can send FCP CMD 1, having exchange identification 8000, over a fiber channel fabric via fiber channel physical interface 210 to a target. In this case, FCP CMD 1 includes a SCSI READ command (e.g., SCSI CMD 1). In response to FCP CMD 1, fiber channel controller 208 can receive a fiber channel reply (e.g., FCP RPL 1) that includes data frames and an exchange identification of 8000. Because the exchange identification of FCP CMD 1 is 8000, indicating data flow from the target, fiber channel controller 208 can expect FCP RPL 1 to include data. If fiber channel controller 208 is in hardware assist mode for READ commands, fiber channel controller 208 can automatically process any additional transactions with the target corresponding to FCP CMD 1. If fiber channel controller 208 is not in hardware assist mode for READ commands, fiber channel controller 208 can interact with interface logic 204 to process additional transactions with the target corresponding to FCP CMD 1.

Interface logic 204 can assign FCP CMD 2 the same exchange identification as FCP CMD 1 because SCSI CMD 2 is linked to SCSI CMD 1. In this case, FCP CMD 2, which encapsulates a WRITE command, is assigned the exchange identification 8000. Fiber channel controller 208 can forward frames corresponding to FCP CMD 2 to a target device over fiber channel interface 210. Fiber channel controller 208 can receive a reply (FCP RPL 2) that includes the 8000 exchange identification from the target in response to FCP CMD 2. FCP RPL 2 can be, for example, a transfer ready reply.

Because FCP CMD 2 was assigned an exchange identification of 8000, fiber channel controller 208 may not expect a transfer ready reply. In other words, fiber channel controller 208 may not expect a response to a WRITE command to FCP CMD 2 because FCP CMD 2 is assigned an exchange identification that typically corresponds to READ commands. Fiber channel controller 208 can, therefore, halt hardware assist in the WRITE direction, if enabled, send an interrupt (e.g., interrupt 212) to interface logic 204 and indicate that it received FCP RPL 2 on exchange 8000. Essentially, fiber channel controller 208 seeks assistance from interface logic 204 in handling the unexpected reply. Interface logic 204 can instruct fiber channel controller to process FCP RPL 2 as it is a reply to a command that was assigned the 8000 exchange identification. This can include, for example, instructing fiber channel controller 208 to send the amount of data indicated by a transfer ready response, provide pointers to the appropriate frame structures and data and restart hardware assist in the WRITE direction.

In the example above, interface logic 204 assigns linked commands an exchange identification that indicates data flow from a target (i.e., data flow in the READ direction). In this case, every time a transfer ready or other reply to a WRITE command is received on that exchange, the fiber channel controller will stop the command in process and seek assistance from interface logic 204 as described above. If, on the other hand, interface logic 204 assigns an exchange identification indicating data flow to the target (e.g., in the write direction), fiber channel controller 208 can stop the command in process and seek assistance from interface logic 204 when a response to a READ command is received over that exchange (e.g., the 0xxx exchange).

Interface logic 204 can assign an exchange identification corresponding the data flow direction specified in the command for unlinked commands (e.g., assign an 8xxx identification for READ commands and a 0xxx identification for WRITE commands), and can assign the same exchange identification for linked commands regardless of the direction of data flow specified by the command (e.g., assign the same 8xxx identification to linked READ and WRITE commands or the same 0xxx identification to linked READ and WRITE commands). According to yet another embodiment of the present invention, interface logic 204 can assign an exchange identification corresponding to a data flow in a particular direction to all commands, whether linked or unlinked. In this case, for example, interface logic can assign an 8xxx exchange identification or a 0xxx exchange identification to all READ and WRITE commands, with linked commands receiving the same exchange identification. If an 8xxx exchange identification is assigned to all commands, then fiber channel controller will stop the command in progress and seek assistance from interface logic 204 every time a transfer ready or other response to a WRITE command is received. By assigning the same type of exchange identification to all commands, the amount of code required for the fiber channel driver or other program is reduced.

In the above examples, READ and WRITE commands are assigned an exchange identification that corresponds to data flow in a particular direction. Embodiments of the present invention can also assign exchange identifications to any other command. Additionally, embodiments of the present invention can assign the same exchange identification to frames associated with a SKIP READ command or a SKIP WRITE commands. A SKIP READ command is essentially a WRITE command followed by a linked READ command and a SKIP WRITE command is essentially a WRITE command followed by a linked WRITE command. Thus, at least a portion of a SKIP READ command specifies data flow to a target and a portion specifies a data flow direction from the target. SKIP READ and SKIP WRITE commands are used by the AS400 Server produced by International Business Machines of Armonk, N.Y. Embodiments of the present can further process other linked commands, including proprietary or vendor unique linked commands, known or developed in the art.

While, in the examples above, the direction of data flow for a command is indicated by the exchange identification, other fiber channel controllers may have different indicators of the direction of data flow. Embodiments of the present invention can assign an indicator of the direction of data flow (e.g., exchange identification, flag or other indicator) to frames to indicate a direction of data flow in the same direction or in the opposite direction of the direction specified in the command. All linked commands in a group of linked commands can be assigned the same indicator.

Figure 3A:
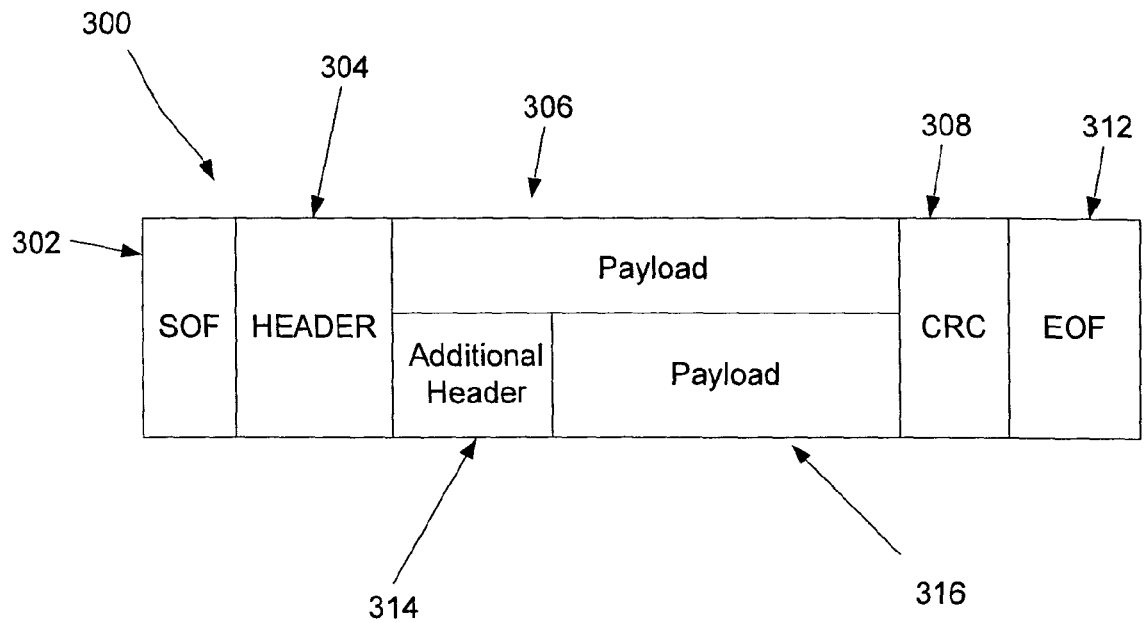
FIG. 3A and FIG. 3B are diagrammatic representations of a frame and frame header.

FIG. 3A is a diagrammatic representation of one embodiment of a fiber channel frame 300. Frame 300 can include a start of frame ("SOF") delimiter 302, a frame header 304, a cyclical redundancy check ("CRC") 308, the data to be transmitted (payload 310) and an end of frame delimiter ("EOF") 312. SOF delimiter 302, according to one embodiment, is four bytes, frame header 304 is twenty four bytes, payload 310 is 2112 bytes, CRC 308 is 4 bytes and EOF delimiter 312 is four bytes. Rather than having a 2112 byte payload, frames can optionally include additional header information 314 and payload 316. Additional header information 314 can be sixty four bytes and payload 316 can be 2048 bytes.

Figure 3B:
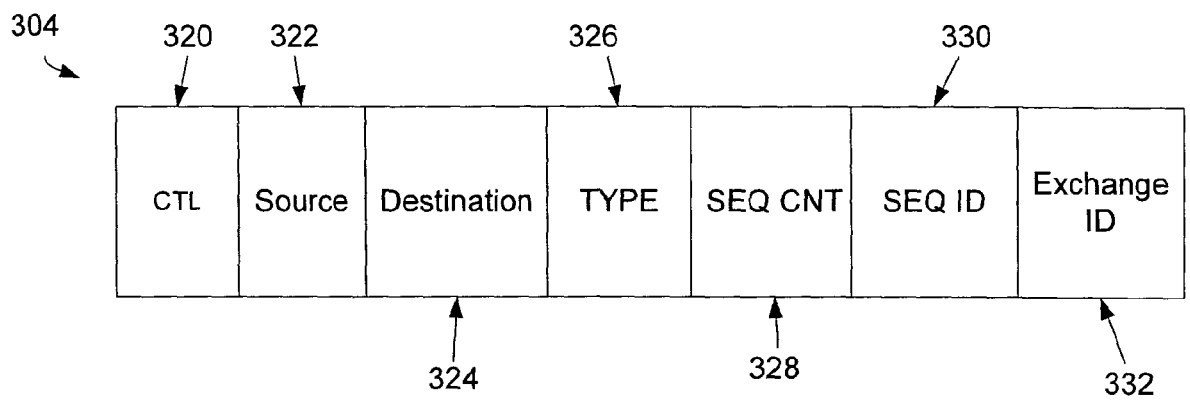

FIG. 3B is a diagrammatic representation of frame header 304. Frame header 304 can include CTL 320, source address 322, destination address 324, type 326, sequence count 328, sequence identification 330, and exchange identification 332. As described above, interface logic can provide header information that can be used by a fiber channel controller to build header 304. This header information can include exchange identification 322. The interface logic can format the header information such that each header for a set of linked commands has the same exchange identification even if the linked commands require data flow in both directions. It should be noted that the frame and header structures provided in FIGS. 3A and 3B are provided by way of example.

Figure 4:
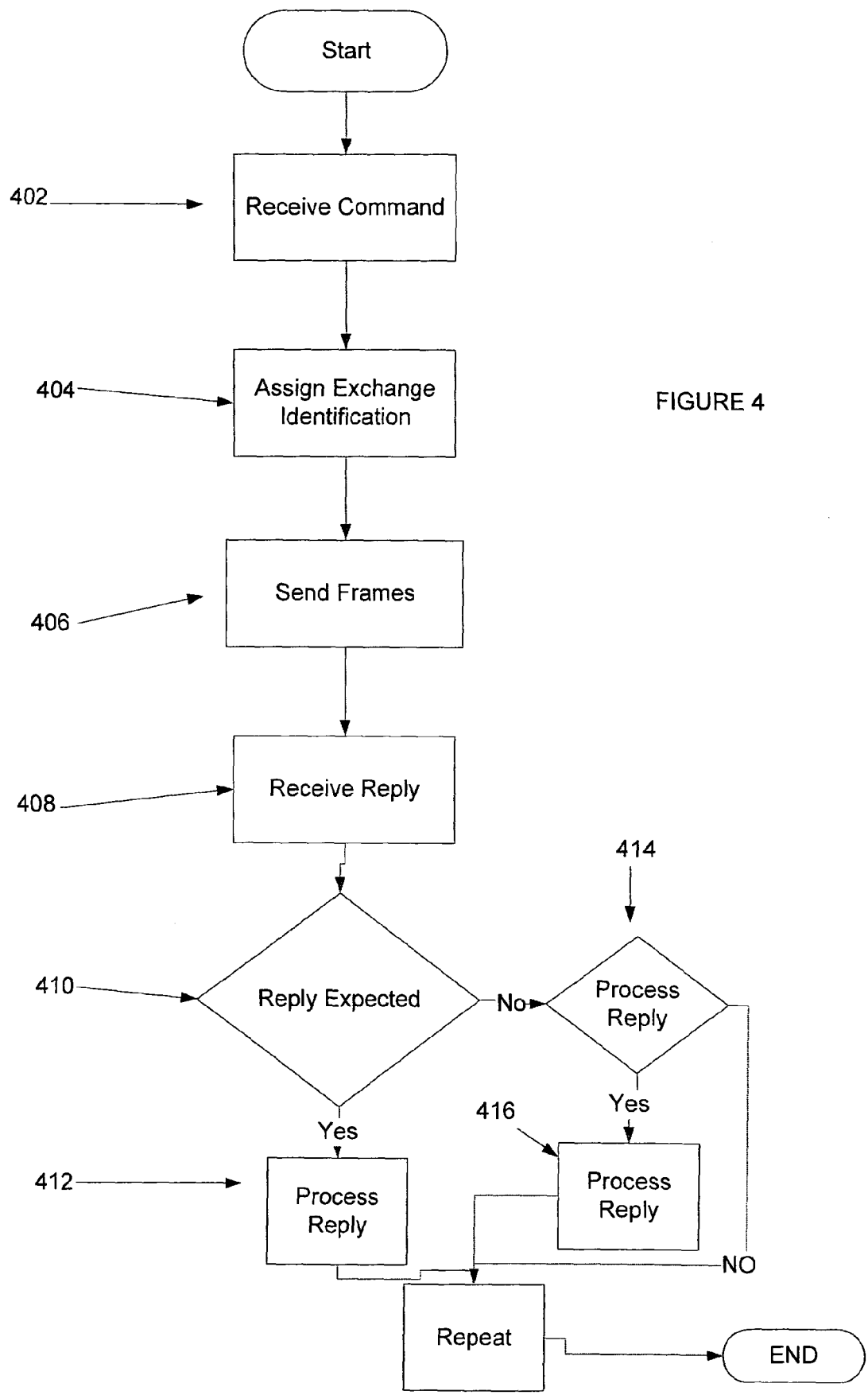
FIG. 4 is a flow chart illustrating one embodiment of processing a command.

FIG. 4 is a flow chart illustrating one embodiment of a method for processing bidirectional commands. Embodiments of the present invention can be implemented as, for example, a set of computer instructions stored on a computer readable medium. The computer instructions can be implemented at any interface device that processes linked commands including, for example, a NIC, a HBA a server attached device, a routing device (e.g., a storage routing device) or other device.

According to one embodiment of the present invention, the interface device, at step 402, can receive a command according to any data transport protocol known in the art. The command can be, for example, a SCSI command or a proprietary command such as the SKIP READ or SKIP WRITE command utilized by the IBM AS400. At step 404, the interface device can assign an exchange identification to the command. If the command is a linked command, the interface device can assign the command the same exchange identification as other commands in the group of linked commands. According to one embodiment of the present invention, the exchange identification can indicate a direction of data flow. In other words, the exchange identification can specify that data on that exchange should flow in the read direction (from the target) or the write direction (to the target). The direction indicated by the exchange identification may be the same as or different from the direction of data flow specified by the command. According to another embodiment of the present invention, the interface device can assign a data flow direction indicator that specifies the direction of data flow for an exchange. The data flow direction indicator can be assigned, for example, in the additional header information section of frames associated with the command.

The interface device, at step 406, can send frames associated with the command to another device (e.g., a target, switch, router or other device) via data transport protocol such as a fiber channel protocol. At step 408, the interface device can receive a reply from the target. If the reply is expected, as determined at step 410, based on the direction of data flow indicated by the exchange identification or data flow direction indicator, the interface device can process the reply and any remaining transactions as it normally would (step 412). If, however, the reply is unexpected based on the direction of data flow indicated by the exchange identification or data flow direction indicator, the interface device can determine whether to process the reply (step 414) and process the reply accordingly (step 416). The process of FIG. 4 can be arbitrarily repeated as needed or desired.

As an example, if the interface device receives a WRITE command (step 402), the interface device can assign the WRITE command an exchange identification (step 404). If the WRITE command is linked to a previous command, the interface device can assign the same identification to the write command as it assigned to a previous linked command. The interface device can, for example, assign an exchange identification of 8000 to the WRITE command. Frames associated with the WRITE command will, therefore, include the exchange identification 8000. If the fiber channel controller used by the interface device is a TACHYON based fiber channel controller, the exchange identification also serves as an indicator of the direction of data flow. In this case, the exchange identification indicates a direction of data flow in the opposite direction than specified by the WRITE command. That is, the exchange identification indicates a direction of data flow in the read direction, whereas the WRITE command specifies a direction of data flow in the write direction.

The interface device can send frames associated with the command and containing the exchange identification to another device (step 406). In response to the command, the interface device can receive a reply (step 408). Because the command in this example is a WRITE command, the interface device can receive, for example, a transfer ready reply including the exchange identification 8000. In this case, a transfer ready reply will be unexpected because the exchange identification indicates a data flow from the target (e.g., in the read direction) and the transfer ready reply indicates that a target is ready to receive a specified amount of data. The interface device can determine that the transfer ready reply is in response to a WRITE command based on, for example, the exchange identification or other characteristic of the transfer ready response. Because the transfer ready reply is based on a command sent by the interface device, the interface device can format data frames and send the data frames to the target (step 414 and step 416). The interface device can process similar replies to the WRITE command, such as additional transfer ready replies and an FCP response similarly.

If, in the above example, the command is READ rather than a WRITE command, and the command is assigned the 8000 exchange identification, any standard or proprietary reply to a READ command can be expected. This occurs because both the command and exchange identification indicate a data flow direction from the target (e.g., in the read direction). The interface device, in this case, can process replies to the READ command.

The SKIP READ typically requires data flow in both directions. The interface device, according to one embodiment, can assign frames associated with a particular SKIP READ command the same exchange identification and/or other indicator of data flow direction. If, using the example of a TACHYON fiber channel controller, an 8XXX exchange identification is assigned to a SKIP READ command, some replies will be expected (e.g., those associated with the READ portion of the SKIP READ command) and others will be unexpected (e.g., those associated with the WRITE portion of the SKIP READ command). If a 0XXX exchange identification is assigned, on the other hand, replies associated with the WRITE portion (e.g., transfer ready and FCP responses) will be expected, whereas replies associated with the READ portion will be unexpected. The expected and unexpected replies can be processed as discussed above.

Figure 5:
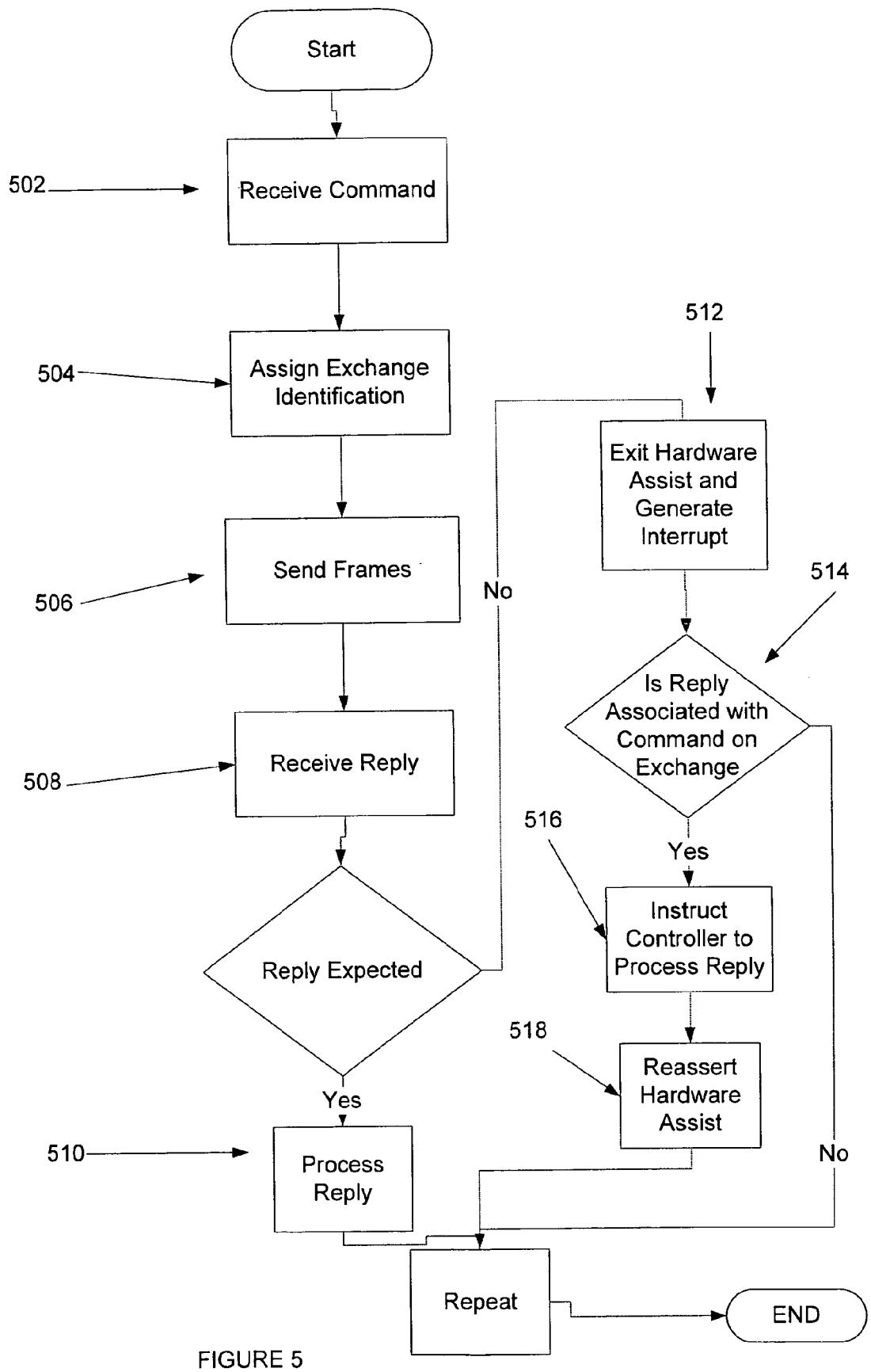
FIG. 5 is a flow chart illustrating a more particular example of processing a command according to one embodiment of the present invention.

FIG. 5 is a flow chart illustrating a method for is a flow chart illustrating one embodiment of a method for processing commands for an interface device using a TACHYON fiber channel controller. It is assumed for the purposes of explanation that the TACHYON fiber channel control is hardware assist enabled in both the read and write directions. At step 502, the interface device can receive a command such as a SCSI READ command a SCSI WRITE command, a SKIP READ command, a SKIP WRITE command or other command known in the art. The command can be received according to any data transport protocol known in the art including, but not limited to, SCSI, fiber channel, ATA, SATA, SAS, iSCSI, parallel SCSI, parallel SCSI, Infiniband or other data transport protocol. At step 504, the interface device can assign the command an exchange identification. If the command is a linked command, the interface device can assign the command the same exchange identification as other commands in the group of linked commands. As an example the interface device can assign the command the exchange identification 8000, which indicates to the TACHYON fiber channel controller that data flow on the exchange will be in the read direction (i.e., from the target).

The interface device can send frames associated with the command and containing the exchange identification to another device (step 506). In response to the command, the interface device can receive a reply (step 508). If the reply is a reply that is typically received in response to a READ command, such as data frames, the TACHYON fiber channel controller can process the command according to its hardware assist processes (step 510). If, on the other hand, the reply is unexpected, such as a transfer ready reply, FCP response or other reply not typically received in response to a read command, the TACHYON fiber channel controller can exit its hardware assist mode and generate an interrupt (step 512). The fiber channel controller will not expect a reply to a WRITE command in this case because the exchange identification indicates a data flow in the read direction.

The interface device, at step 514, can determine whether the reply is an error or is in response to a command specifying data flow in the write direction, but assigned an exchange identification indicating data flow in the read direction. If the reply corresponds to a command specifying data flow in the write direction, the interface device can instruct the fiber channel controller of the interface device to process the reply (step 516). The interface device can place the TACHYON fiber channel controller back in hardware assist mode for the write direction (step 518). For each transfer ready or FCP response received by the fiber channel controller, steps 512-518 can be repeated. The process of FIG. 5 can be arbitrarily repeated as needed or desired.

As can be understood from the foregoing, embodiments of the present invention provide an interface device and method for command processing for commands requiring data flow in both directions on a Fiber Channel or other data transport protocol exchange. The commands can include proprietary commands, SCSI linked commands or other commands known in the art. According to one embodiment, and interface device can assign a command a data flow direction indicator. When a reply to the command is received, the interface device can determine if the reply is expected or unexpected based on the data flow direction specified by the data flow direction indicator. If the reply is unexpected, the interface device can determine whether the reply is associated with a command sent over the exchange and, if so, process the reply. According to one embodiment, the data flow direction indicator can be the exchange identification.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method of processing commands at an interface device between a first data transport protocol and a second data transport protocol, comprising:

providing an interface device comprising an interface for a first transport medium, a first controller for the first interface, a second interface for a second transport medium, a second controller, and interface logic comprising instructions executable to perform the steps of:

receiving a first command according to the first data transport protocol over a network at the interface device, wherein at least a portion of the first command specifies a first data flow direction;

assigning the first command an exchange identification that indicates a second data flow direction, wherein the second data flow direction is opposite the first data flow direction;

forwarding the first command according to the second data transport protocol using the exchange identification indicating a second data flow direction, wherein the forwarded first command is linked to one or more additional commands;

receiving a reply to the first command including an exchange identification;

when the reply to the first command contains an exchange identification corresponding to the second data flow direction and a response corresponding to the second data flow direction, processing the command; and when the reply contains an exchange identification corresponding to the second data flow direction and a response corresponding to the first data flow direction, determining if the reply is associated with the first command;

wherein when the reply is associated with the first command, processing the reply;

when the reply is not associated with the first command, treating the reply as an error; and assigning the exchange identification assigned to the first command to at least one additional command that specifies data flow in the second direction and is linked to the first command and forwarding the at least one additional command so that data flow of the first command and the at least one additional command occurs in the first and second direction on a same exchange.

2. The method of claim 1, wherein the first data transport medium is SCSI and the second data transport medium is Fibre Channel.

3. The method of claim 2, wherein the first command is a SCSI command.

4. The method of claim 1, wherein the first data transport medium and the second data transport medium are different.

5. The method of claim 1, wherein the first data transport protocol and the second data transport protocol are different.

6. The method of claim 1, wherein the first command is a linked command.

7. The method of claim 1, further comprising assigning the first command a data flow direction.

8. An interface device capable, comprising:
   a first controller configured to:
      receive a first command over a first data transport medium according to a first data transport protocol;
   a second controller configured to:
      connect to a second data transport medium operating according to a second data transport protocol; and
   interface logic configured to:
      receive the first command from the first controller, wherein at least a portion of the first command specifies a first data flow direction;
      assign the first command an exchange identification that indicates a second data flow direction, wherein the second data flow direction is opposite the first data flow direction;
      provide the first command to the second controller to forward the first command according to the second data transport protocol using the exchange identification indicating a second data flow direction, wherein the forwarded first command is linked to one or more additional commands;
      receive a reply to the first command including an exchange identification;
      when the reply to the first command contains an exchange identification corresponding to the second data flow direction and a response corresponding to the second data flow direction, processing the command; and
      when the reply contains an exchange identification corresponding to the second data flow direction and a response corresponding to the first data flow direction, determining if the reply is associated with the first command;
         wherein when the reply is associated with the first command, processing the reply;
         when the reply is not associated with the first command, treating the reply as an error; and
      assign the exchange identification assigned to the first command to at least one additional command that specifies data flow in the second direction and is linked to the first command and forwarding the at least one additional command so that data flow of the first command and the at least one additional command occurs in the first and second direction on a same exchange.

9. The interface device of claim 8, wherein the first data transport medium is SCSI and the second data transport medium is Fibre Channel.

10. The interface device of claim 9, wherein the first command is a SCSI command.

11. The interface device of claim 8, wherein the first data transport medium and the second data transport medium are different.

12. The interface device of claim 8, wherein the first data transport protocol and the second data transport protocol are different.

13. The interface device of claim 8, wherein the first command is a linked command.

14. The interface device of claim 8, wherein the interface logic is further configure to assign the first command a data flow direction.

15. A non-transitory computer readable medium comprising instructions for:
   receiving a first command according to a first data transport protocol over a network at an interface device on a first transport medium, wherein at least a portion of the first command specifies a first data flow direction;
   assigning the first command an exchange identification that indicates a second data flow direction, wherein the second data flow direction is opposite the first data flow direction;
   forwarding the first command according to over a second data transport medium according to a second data transport protocol using the exchange identification indicating a second data flow direction, wherein the forwarded first command is linked to one or more additional commands;
   receiving a reply to the first command including an exchange identification;
      when the reply to the first command contains an exchange identification corresponding to the second data flow direction and a response corresponding to the second data flow direction, processing the command; and
      when the reply contains an exchange identification corresponding to the second data flow direction and a response corresponding to the first data flow direction, determining if the reply is associated with the first command;
         wherein when the reply is associated with the first command, processing the reply;
         when the reply is not associated with the first command, treating the reply as an error; and
      assigning the exchange identification assigned to the first command to at least one additional command that specifies data flow in the second direction and is linked to the first command and forwarding the at least one additional command so that data flow of the first command and the at least one additional command occurs in the first and second direction on a same exchange.

16. The non-transitory computer readable medium of claim 15, wherein the first data transport medium is SCSI and the second data transport medium is Fibre Channel.

17. The non-transitory computer readable medium of claim 16, wherein the first command is a SCSI command.

18. The non-transitory computer readable medium of claim 15, wherein the first data transport medium and the second data transport medium are different.

19. The non-transitory computer readable medium of claim 15, wherein the first data transport protocol and the second data transport protocol are different.

20. The non-transitory computer readable medium of claim 15, wherein the first command is a linked command.

* * * * *